United States Patent [19]
Hirota et al.

[11] Patent Number: 5,398,504
[45] Date of Patent: Mar. 21, 1995

[54] LAYOUT STRUCTURE OF CATALYTIC CONVERTERS

[75] Inventors: Tomotaka Hirota; Shinobu Miyaura; Hisashi Sera; Eiichiro Kawano, all of Hiroshima, Japan

[73] Assignee: Mazda Motor Corporation, Japan

[21] Appl. No.: 10,983

[22] Filed: Jan. 29, 1993

[30] Foreign Application Priority Data

Jan. 31, 1992 [JP] Japan .................. 4-016157

[51] Int. Cl.$^6$ .............................................. F01N 3/28
[52] U.S. Cl. ........................................ 60/302; 60/298; 60/323
[58] Field of Search ................. 60/302, 323, 298

[56] References Cited
U.S. PATENT DOCUMENTS 4,653,270  3/1987  Takii ......................... 60/302
5,144,800  9/1992  Shioya ....................... 60/323
5,195,607  3/1993  Shimada .................... 60/299

FOREIGN PATENT DOCUMENTS 63-102922  7/1988  Japan .
3-46180    9/1991  Japan .

Primary Examiner—Douglas Hart

[57] ABSTRACT

A layout structure of catalytic converters, used for an engine transversely arranged in an engine room formed in a front portion of a vehicle, includes a front catalytic converter connected to an exhaust manifold arranged in a forward direction of the vehicle with respect to the engine, and a rear catalytic converter connected to an exhaust manifold arranged in a backward direction of said vehicle, wherein the rear catalytic converter is arranged to be offset from a central position of the engine arranged along a widthwise direction of the vehicle by a predetermined distance. With this structure, the rear catalytic converter can be cooled in the same manner as the front catalytic converter. In addition, the rear catalytic converter is formed into a cylindrical member having an elliptic/oval cross-sectional shape with a major axis coinciding with a longitudinal direction of the vehicle, thus increasing the area of a heat-dissipating surface of the rear catalytic converter. With this structure, heat dissipation can be promoted, and cooling air can be quickly exhausted through a tunnel portion continuous with the engine room after a cooling operation.

18 Claims, 6 Drawing Sheets

LAYOUT STRUCTURE OF CATALYTIC CONVERTERS

BACKGROUND OF THE INVENTION

The present invention relates to the layout structure of catalytic converters for an engine and, more particularly, to the layout of catalytic converters applied to a transverse engine. A so-called transverse engine is known as a conventional engine which is arranged in an engine room such that the engine output shaft is almost vertical to the longitudinal direction of a vehicle. Of transverse engines of this type, a V-cylinder engine which has banks in the longitudinal direction of a vehicle, and is used for an FF automobile or a 4WD automobile is known to have two catalytic converters. One catalytic converter is arranged to face the forward direction of the vehicle so as to clean an exhaust gas expelled from the front engine bank. The other catalytic converter is arranged to face the backward direction of the vehicle so as to clean an exhaust gas expelled from the rear engine bank. For example, Japanese Utility Model Laid-Open No. 63-102922 discloses the detailed arrangement of such an engine.

On the other hand, for example, Japanese Utility Model Publication No. 3-46180 discloses an arrangement in which an air-cooling inter cooler for cooling air compressed by a supercharger is disposed above an engine having an exhaust supercharger (turbo charger).

Assume that a mechanical supercharger (supercharger) is to be arranged for a V-cylinder engine. In this case, when the mechanical supercharger is arranged in a space between the above-mentioned front and rear engine banks, a driving force of the mechanical supercharger can be easily obtained as part of an engine output. In addition, the overall structure can be reduced in size.

The following problems, however, are posed in the above-described structure in which one catalytic converter (to be referred to as a front catalytic converter hereinafter) is arranged near the front engine bank, of the V-cylinder engine, which is arranged to face the forward direction of the vehicle, so as to clear an exhaust gas from the front engine bank, and the other catalytic converter (to be referred to as a rear catalytic converter hereinafter) is arranged near the rear engine bank, which is arranged to face the backward direction of the vehicle, so as to clean an exhaust gas from the rear engine bank.

Cool air which is generated when the vehicle travels or a radiator fan is driven can be positively blown to only the front catalytic converter. However, the cool air is blocked by the engine itself including an engine block and hence cannot be sufficiently blown to the rear catalytic converter. For this reason, various problems are pointed out, e.g., an abnormal temperature rise of the rear catalytic converter, a deterioration in the catalyst due to the temperature rise, and accumulation of heat in portions behind the engine.

In addition, since the degree to which traveling air is blown to the front catalytic converter is inevitably larger than that to the rear catalytic converter, the temperature rise of the front catalytic converter differs from that of the rear catalytic converter, resulting in a difference between the cleaning effect of the front catalyst and that of the rear catalyst.

On the other hand, for example, in order to arrange a turbo charger or supercharger with respect to a transverse V-cylinder engine, an air-cooling inter cooler for cooling air compressed by each supercharger is disposed above the V-cylinder engine. In this case, intake air to the air-cooling inter cooler to be used for a cooling operation is introduced into the engine room from a portion in front of the engine, and the air is then caused to quickly escape outside the vehicle. Therefore, intake air cooled by the air-cooling inter cooler is not effectively used.

SUMMARY OF THE INVENTION

The present invention, therefore, has been made in consideration of the above situation, and has as its principal object to minimize the difference between the degrees to which cooling air is blown to front and rear catalytic converters arranged near an exhaust portion of a transverse engine so as to reduce the difference in temperature rise between the front and rear catalytic converters, thereby eliminating the difference in cleaning effect between the front and rear catalytic converters.

It is another object of the present invention to allow a sufficient amount of cooling air to be blown to each of front and rear catalytic converters to prevent an abnormal temperature rise of the rear catalytic converter, thereby preventing a deterioration in a catalyst, and preventing accumulation of heat at a rear portion of an engine.

It is still another object of the present invention to positively cool a rear catalytic converter by effectively using outer air introduced to cool an air-cooling inter cooler, in a case wherein the air-cooling inter cooler is arranged above a transverse engine having a supercharger, thereby reducing the difference in temperature rise between the front and rear catalytic converters and eliminating the difference in cleaning effect between the front and rear catalytic converters.

In addition to the above objects, it is still another object of the present invention to design a transverse engine to be as compact as possible in the longitudinal direction of a vehicle.

In order to achieve the above objects, according to the present invention, there is provided a layout structure of catalytic converters for an engine transversely arranged in an engine room formed in a front portion of a vehicle, comprising a front catalytic converter connected to an exhaust manifold arranged in a forward direction of the vehicle with respect to the engine, and a rear catalytic converter connected to an exhaust manifold arranged in a backward direction of the vehicle, wherein the rear catalytic converter is arranged to be offset from a central position of the engine arranged along a widthwise direction of the vehicle by a predetermined distance. With this structure, cooling air passing through portions around the engine can be efficiently blown to the rear catalytic converter, thereby sufficiently cooling the rear catalytic converter as well as the front catalytic converter. Preferably, the rear catalytic converter is formed into a cylindrical member having an elliptic/oval cross-sectional shape with a major axis coinciding with a longitudinal direction of the vehicle, thus increasing the area of a heat-dissipating surface of the rear catalytic converter. With this structure, heat dissipation can be promoted, and cooling air can be quickly exhausted through a tunnel portion continuous with the engine room after a cooling operation.

In addition, the rear catalytic converter is formed into a cylindrical member having an elliptic/oval cross-sectional shape with a major axis coinciding with a longitudinal direction of the vehicle, and the rear catalytic converter is arranged to be offset from a central position of the engine arranged along a widthwise direction of the vehicle by a predetermined distance. With this structure, the rear catalytic converter can be cooled in the same manner as the front catalytic converter. With this structure, the area of a heat-dissipating surface of the rear catalytic converter is increased to promote heat dissipation.

Furthermore, the rear catalytic converter is preferably arranged to be offset from a central position of the engine arranged along a widthwise direction of the vehicle by a predetermined distance, and the respective exhaust manifolds are joined to each other below the engine, and a main catalytic converter is arranged below the engine. With this structure, the engine can be designed to be compact in the longitudinal direction of the vehicle.

Moreover, there is preferably provided a layout structure of catalytic converters comprising an inter cooler arranged above an engine, wherein the inter cooler is arranged to cause passing air which has cooled the inter cooler to flow to the rear catalytic converter. With this structure, the rear catalytic converter is cooled, and passing air can be quickly exhausted through the tunnel portion continuous with the engine room.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 1A:
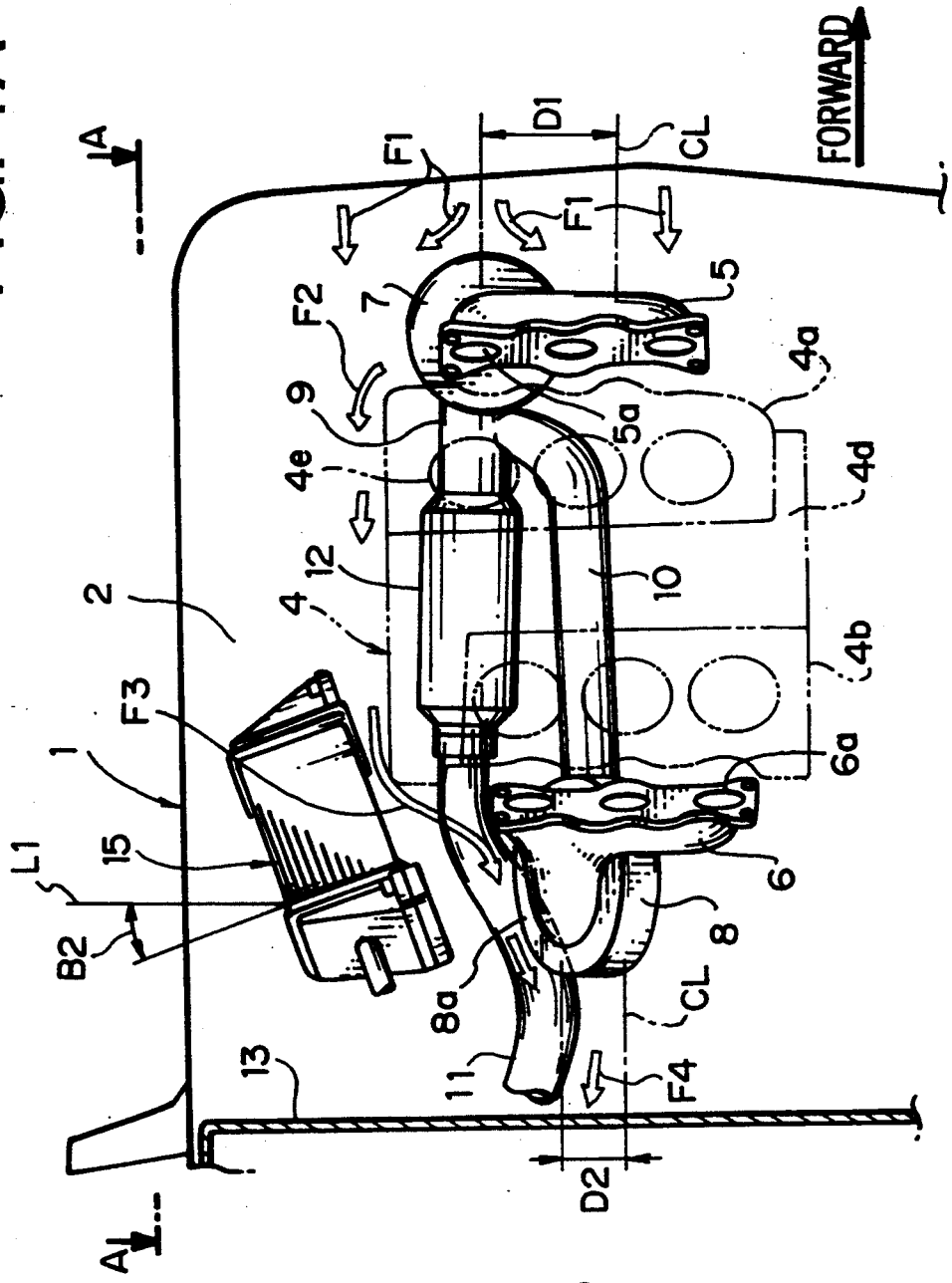
FIG. 1A is a plan view showing the layout structure of catalytic converters according to the first embodiment of the present invention.

Preferred embodiments of the present invention will be described below with reference to the accompanying drawings. FIG. 1A is a plan view of the engine room of a vehicle according to the first embodiment, illustrating a schematic arrangement in which a V6 engine 4 is transversely disposed. Referring to FIG. 1A, an engine room 2 is formed in a front portion of a vehicle, which room is isolated from a vehicle room through an engine room partition wall 13.

In the engine room 2, the V6 engine 4 indicated by the alternate long and two short dashed lines in FIG. 1A is transversely disposed such that the longitudinal direction of the crank shaft of the engine 4 is set along the widthwise direction of the vehicle. As shown in FIG. 1A, the V6 engine 4 is designed such that a narrow portion 4d is formed between front and rear banks 4a and 4b, and three cylinders are arranged in each bank to constitute a 6-cylinder engine. A front exhaust manifold 5 for performing an exhausting operation at a front position is fixed to the front bank 4a, whereas a rear exhaust manifold 6 for performing an exhausting operation at a rear position is fixed to the rear bank 4b. With this arrangement, exhausting operations can be performed, in units of banks, with respect to the respective catalytic converters arranged near the downstream sides of the exhaust manifolds 5 and 6 through exhaust paths 5a and 6a.

More specifically, a front catalytic converter 7 is piped and connected to the front exhaust manifold 5, while a rear catalytic converter 8 is piped and connected to the rear exhaust manifold 6. With this arrangement, an exhaust gas can be cleaned by using a catalyst immediately after an exhausting operation. A main catalytic converter 12 having a large capacity is arranged at the downstream side of each catalytic converter so as to be located below the engine 4. A second exhaust pipe 10 coupled to the rear catalytic converter 8 from below is joined to a first exhaust pipe 9 coupled to the front catalytic converter 7 from below, and the joint pipe is coupled to the main catalytic converter 12. In addition, a third exhaust pipe 11 is connected to the downstream side of the main catalytic converter 12 to carry an exhaust gas in the backward direction of the vehicle. With the above-described arrangement of the exhaust pipes, the transverse V-type engine can be formed into a compact structure in the longitudinal direction of the vehicle.

Figure 1B:
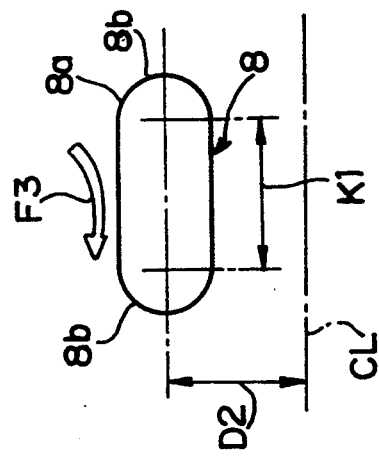
FIG. 1B is a plan view of a rear catalytic converter according to the first embodiment.

The front catalytic converter 7 arranged in the above-described manner is placed in the engine room 2 to be offset from a center line CL of the engine 4, which is the center line, of the engine room 2, extending along the widthwise direction of the vehicle, to the right (viewed from the front side) by a distance D1. The rear catalytic converter 8 is arranged to be offset from the center line CL of the engine 4 to the right (viewed from the front side) by a distance D2. As shown in FIG. 1B, each catalytic converter is formed into a circular, elliptic, or oval shape.

More specifically, as shown in FIG. 1B, the rear catalytic converter 8 has an oval shape having a major axis almost parallel to the center line CL of the engine 4. Side surface portions 8a and arcuated portions 8b are respectively formed at symmetrical positions.

Figure 2:
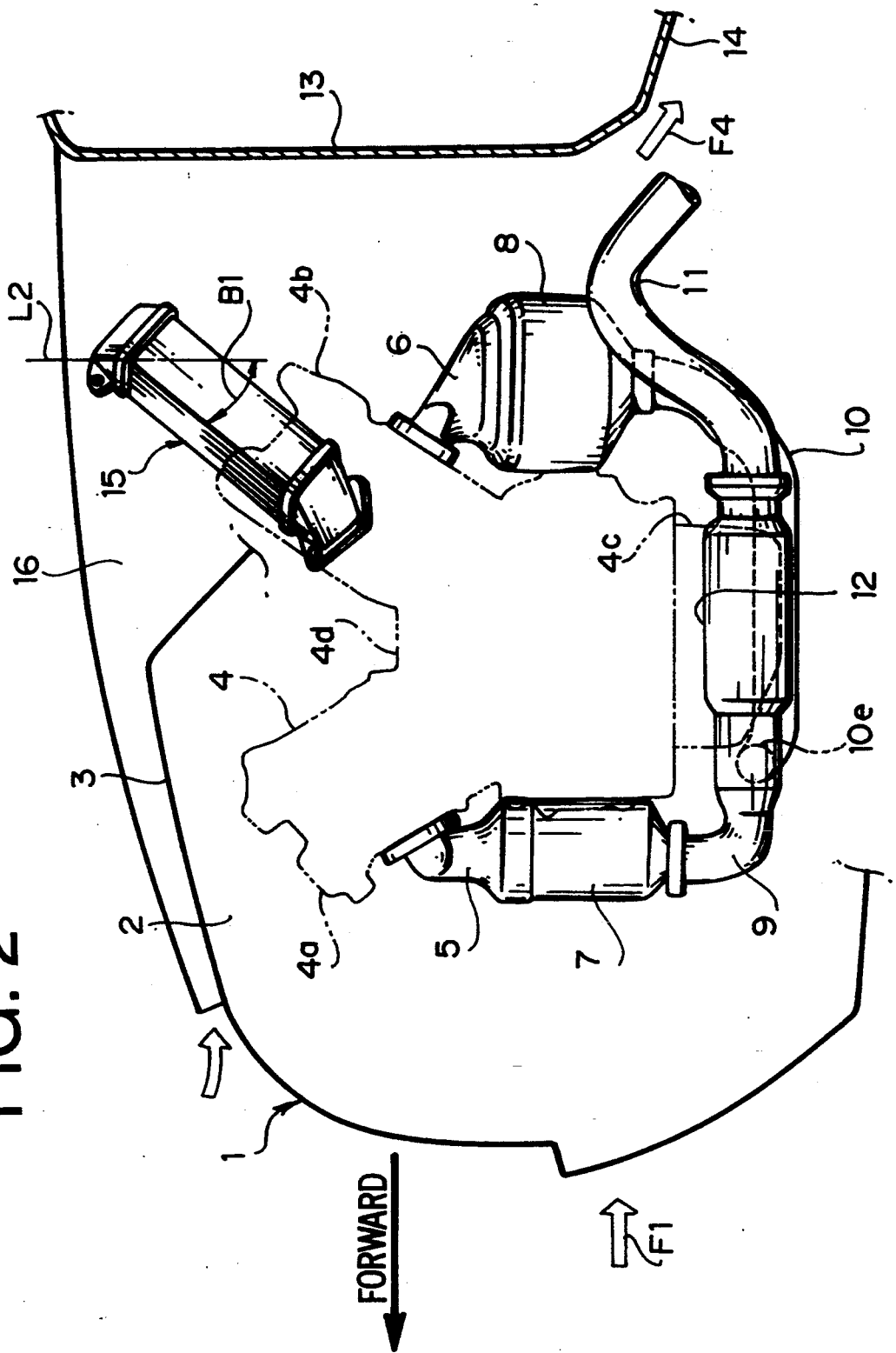
FIG. 2 is a view taken along in the direction indicated by a line A—A.

FIG. 2 is a view taken along a line A—A in FIG. 1A. The arrangement shown in FIG. 1A will be further described below with reference to FIG. 2. An inter cooler 15 for cooling air compressed by a turbo charger or supercharger is arranged for the engine 4 described above. The inter cooler 15 is arranged at a right rear position, of the engine 4, which is near the rear bank 4b of the engine 4, so as to be inclined at a predetermined angle. The inter cooler 15 is fixed in the engine room 2 such that the cooling surface is inclined with respect to an axis L1 extending along the transverse direction of the vehicle by an angle B2 (about 15° to 20°) in FIG.

1A, while the cooling surface is inclined with respect to an axis L2 extending along the vertical plane of the vehicle by an angle B1 (about 30° to 45°), as shown in FIG. 2. The inter cooler 15 arranged in the above-described manner has a height larger than that of an ordinary type so as to ensure a necessary capacity and be stored within a limited space.

In the above-described arrangement, when the vehicle travels or the radiator fan is operated, cooling air such as cooling air F1 for cooling the front and rear catalytic converters 7 and 8 is delivered from the front side of the vehicle into the engine room 2, thus cooling the front catalytic converter 7 first. Subsequently, part of the cooling air F1 flows along a side surface of the engine 4, as shown in FIG. 2, and further flows along the side surface portion 8a of the rear catalytic converter 8 which is arranged to be offset, as described above. Thereafter, the air flows into an engine room tunnel portion 14 continuous with the engine room partition wall 13.

Figure 3:
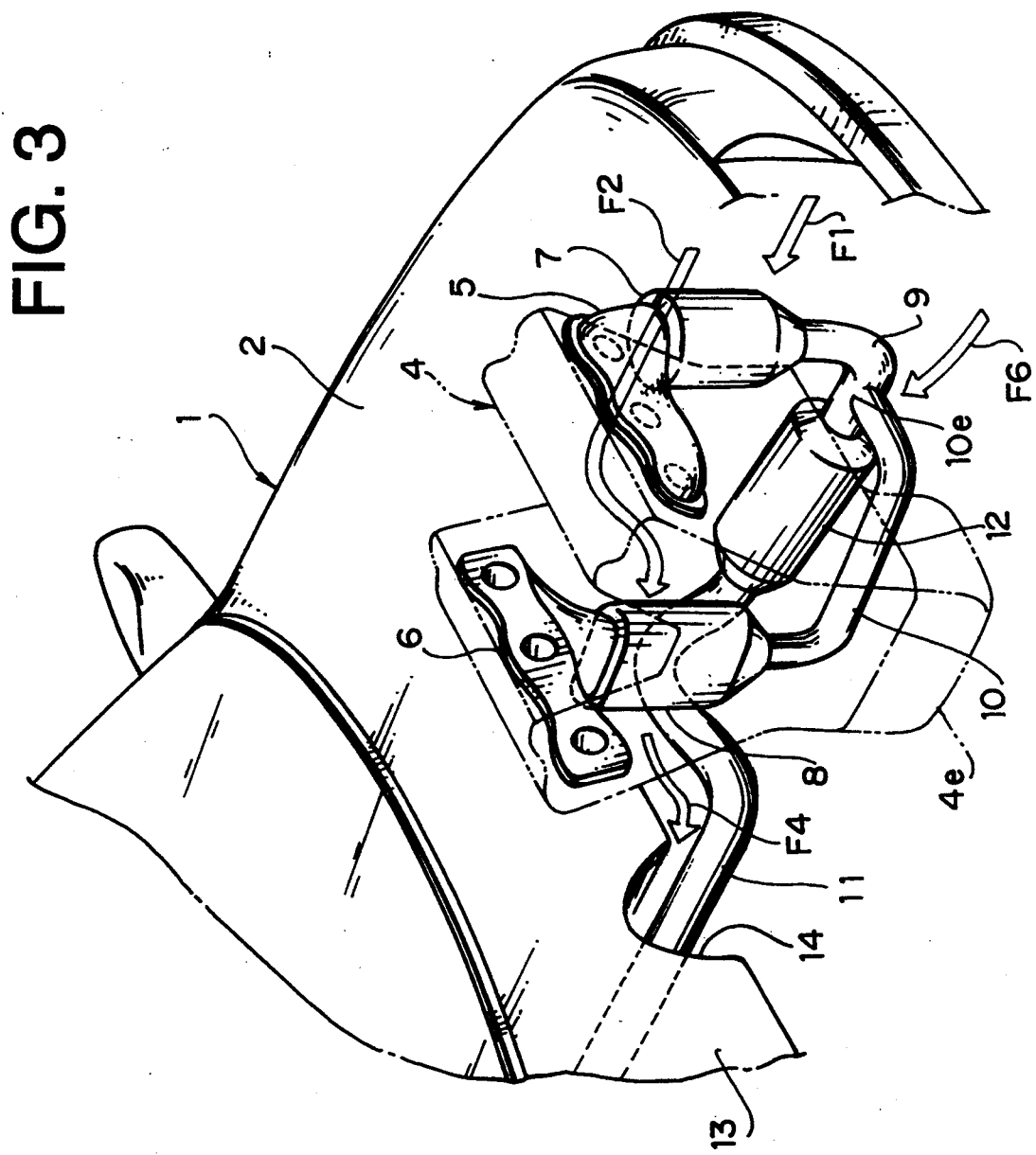
FIG. 3 is a perspective view showing the outer appearance of an engine room in FIG. 1A to explain an operation of the first embodiment.

The flows of the above-mentioned cooling air will be described below with reference to FIG. 3, which is a perspective view of the outer appearance of the engine room in which the V6 engine 4 in FIG. 1 is arranged, stereoscopically illustrating the flows of the cooling air. The same reference numerals in FIG. 3 denote the same parts as those described above, and a description thereof will be omitted. As indicated by the alternate long and two short dashed lines in FIG. 3, an oil pan 4e having a shape which does not interfere with a joint portion 10e of the first and second exhaust pipes 9 and 10 is fixed on the bottom surface of the engine 4. In addition, the engine room tunnel portion 14 is formed below the engine room partition wall 13 to guide the third exhaust pipe 11 to a rear portion of the vehicle through a gap formed between the third exhaust pipe 11 and itself.

In the above-described arrangement, when the vehicle travels or the radiator fan is operated, the cooling air F1 is blown to the front catalytic converter 7. Meanwhile, cooling air F2 cools the side surface portion of the rear catalytic converter 8 and subsequently flows, as cooling air F4, through the engine room tunnel portion 14. In addition, cooling air F6 entering the engine room 2 from a position below a front portion of the vehicle cools the oil pan 4e of the engine 4 and the main catalytic converter 12.

Figure 4:
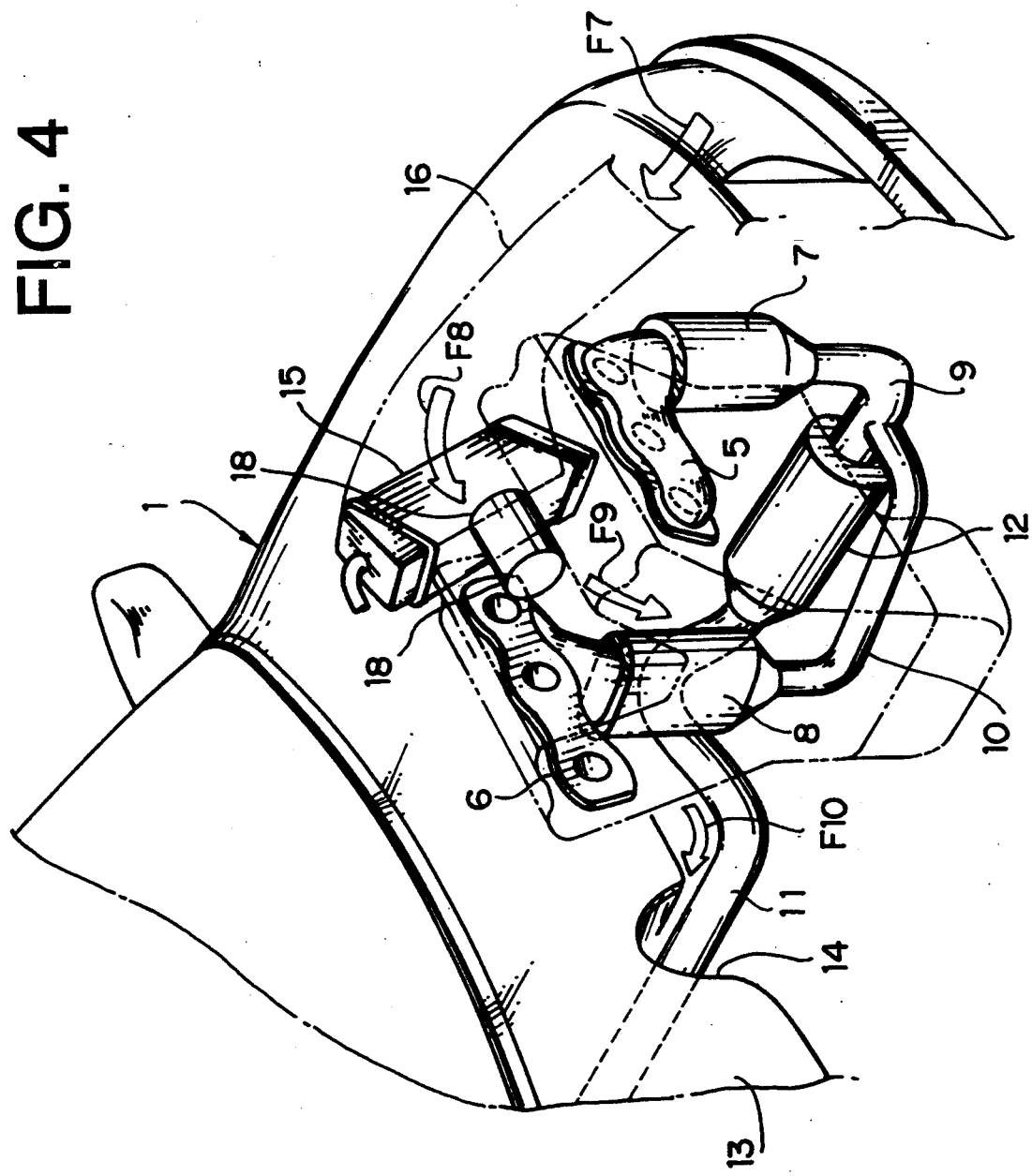
FIG. 4 is a perspective view showing the outer appearance of the engine room to explain an operation of the first embodiment in which an inter cooler is additionally arranged.

FIG. 4 is a perspective view of the outer appearance of the engine room in which the inter cooler 15 is additionally arranged for the V6 engine 4 in FIG. 1, stereoscopically illustrating the flows of the cooling air described above. The same reference numerals in FIG. 4 denote the same parts as those described above, and a description thereof will be omitted. An air intake port 16 for taking in outer air F7 is formed in the bonnet of the engine room 2. In addition, a supercharger 18 as a mechanical supercharger is disposed on the narrow portion 4d between the banks of the engine 4 to generate compressed air. This compressed air is supplied to the inter cooler 15 to be cooled.

In the above-described arrangement, the outer air F7 taken in from the air intake port 16 is blown, as cooling air F8, to the cooling fins of the inter cooler 15 to cool the inter cooler 15. After this cooling operation, the temperature of the cooling air which passes through the cooling fins is slightly increased. This cooling air is then blown, as cooling air F9, to the side surface portion of the rear catalytic converter 8. As a result, the rear catalytic converter 8 can be efficiently cooled. Subsequently, cooling air F10 flows through the engine room tunnel portion 14. In the above-described manner, when the inter cooler 15 is arranged, the rear catalytic converter 8 can be more positively cooled by effectively using outer air taken in to cool the inter cooler 15. With this operation, hot air which tends to stay near the rear bank can be efficiently removed through the engine room tunnel portion 14.

Figure 5:
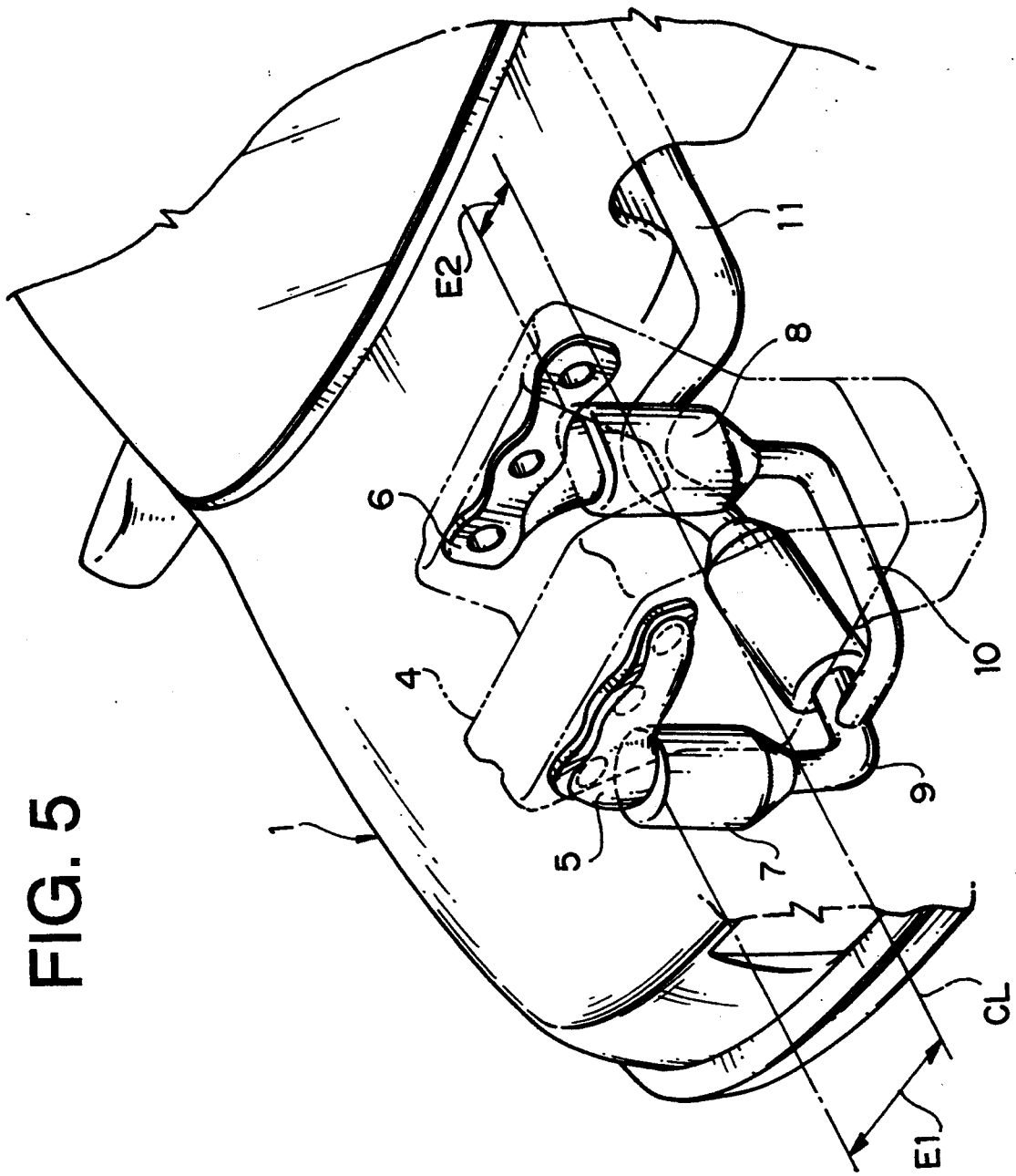
FIG. 5 is a perspective view showing the outer appearance of an engine room according to the second embodiment of the present invention.

FIG. 5 is a perspective view of the outer appearance of an engine room of a vehicle according to the second embodiment of the present invention, illustrating a schematic arrangement in which a V6 engine is disposed. The same reference numerals in FIG. 5 denote the same parts as those described above, and a description thereof will be omitted. An engine 4 indicated by the alternate long and two short dashed lines in FIG. 5 is arranged in an engine room 2 at a front portion of the vehicle to be offset to the left (viewed from the front side). Front and rear catalytic converters 7 and 8 are arranged to be offset from a center line CL of the engine 4 to the left (viewed from the front side) by a distance E1 and a distance E2, respectively. The distance E2 is smaller than the distance E1. In the above-described arrangement, the front and rear catalytic converters are equally cooled, thus ensuring a higher degree of freedom of arrangement of exhaust pipes.

Figure 6:
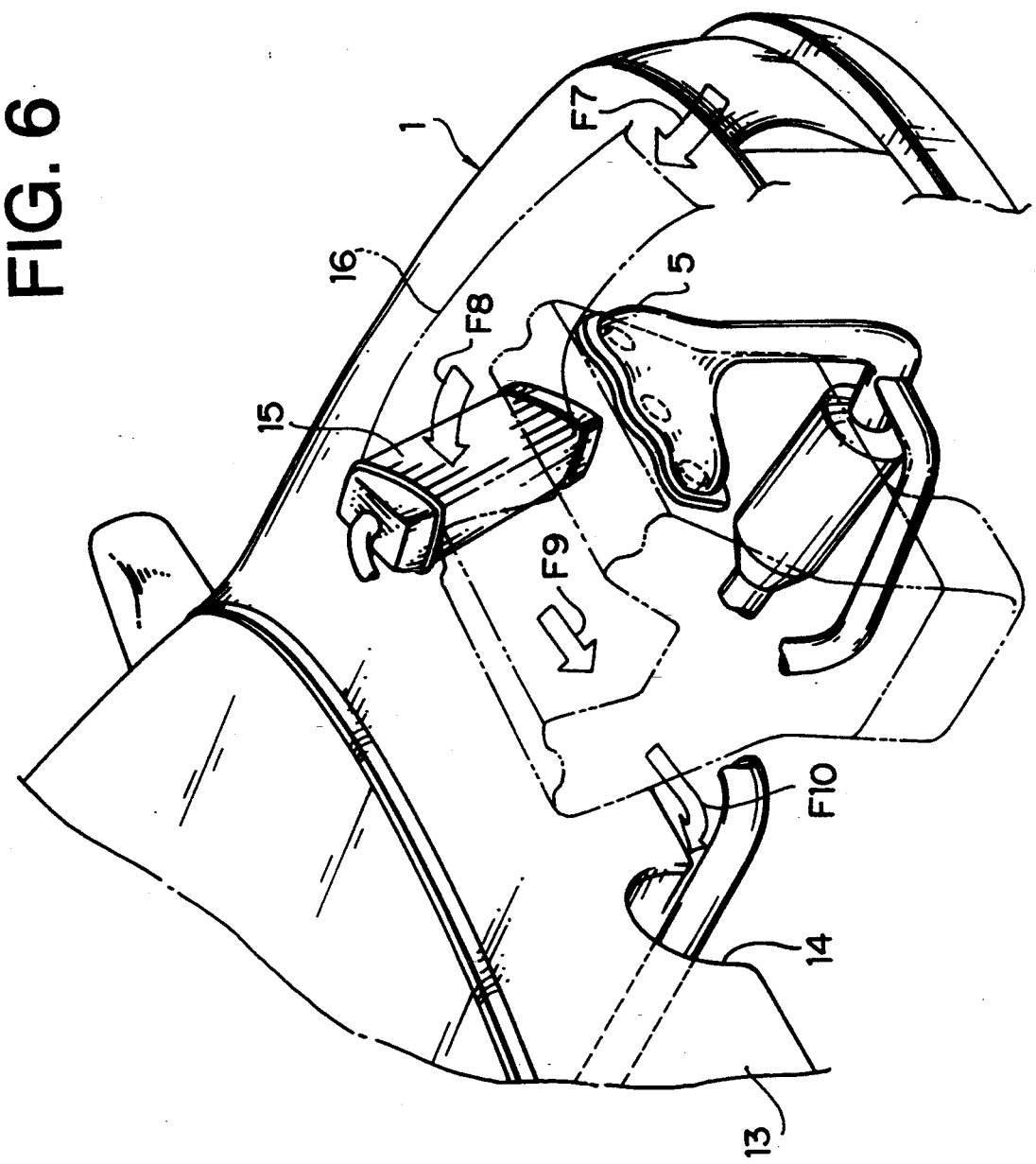
FIG. 6 is a perspective view showing the outer appearance of an engine room according to the third embodiment of the present invention.

FIG. 6 is a perspective view of the outer appearance of an engine room, illustrating the flows of traveling air which acts on an inter cooler regardless of the presence of front and rear catalytic converters. FIG. 6 shows the manner in which the above-described cooling air F7 flows through an engine room tunnel portion 14. As shown in FIG. 6, since an inter cooler 15 is inclined, cooling air F9 which passes through the inter cooler 15 can flow to the rear side of a vehicle through the engine room tunnel portion 14.

Although the above description is limited to the V6 engine, the effect of the present invention becomes more conspicuous as the number of cylinders is increased as with a case of a V8 or V10 engine. In addition, the present invention is not limited to a supercharger, but a turbo charger may be used. Furthermore, if a rear catalytic converter is arranged to be sufficiently offset from an engine to receive a sufficient amount of cooling air, a front catalytic converter can also serve as a rear catalytic converter.

It is apparent that the present invention is not limited to the embodiments described above, and various changes and modifications can be made within the spirit and scope of the invention.

What is claimed is:

1. A layout structure of catalytic converters for an engine transversely arranged in an engine room formed in a front portion of vehicle, comprising
a front catalytic converter connected to an exhaust manifold arranged in a forward direction of said vehicle with respect to said engine, and a rear catalytic converter connected to an exhaust manifold arranged in a backward direction of said vehicle,
wherein said rear catalytic converter is arranged to be offset from a central position of said engine arranged along a widthwise direction of said vehicle by a predetermined distance.

2. A layout structure of catalytic converters for a V-type engine transversely arranged in an engine room formed in a front portion of a vehicle, comprising
a front catalytic converter connected to an exhaust manifold arranged in a forward direction of said vehicle with respect to said engine, and a rear catalytic converter connected to an exhaust manifold arranged in a backward direction of said vehicle, wherein said rear catalytic converter is formed into a cylindrical member having an elliptic/oval cross-sectional shape with a major axis coinciding with a longitudinal direction of said vehicle.

3. The layout structure according to claim 2, wherein said V-type engine is a V6 engine having three cylinders in each of front and rear engine banks.

4. The layout structure according to claim 2, wherein cooling air which has cooled said rear catalytic converter is exhausted to a rear portion of said vehicle through a tunnel portion formed on a bottom surface of said vehicle.

5. The layout structure according to claim 2, wherein passing air which has cooled a substantially flat surface portion of said rear catalytic converter is exhausted to a rear portion of said vehicle through a tunnel portion formed on a bottom surface of said vehicle.

6. A layout structure of catalytic converters for a V-type engine transversely arranged in an engine room formed in a front portion of a vehicle, comprising
a front catalytic converter connected to an exhaust manifold arranged in a forward direction of said vehicle with respect to said engine, and a rear catalytic converter connected to an exhaust manifold arranged in a backward direction of said vehicle, wherein said rear catalytic converter is formed into a cylindrical member having an elliptic/oval cross-sectional shape with a major axis coinciding with a longitudinal direction of said vehicle, and
said rear catalytic converter is arranged to be offset from a central position of said engine arranged along a widthwise direction of said vehicle by a predetermined distance.

7. The layout structure according to claim 6, wherein said rear catalytic converter is arranged to be offset from the central position of said engine, arranged along the widthwise direction of said vehicle, to a right side viewed from a front side of said vehicle by the predetermined distance.

8. The layout structure according to claim 6, wherein said rear catalytic converter is arranged to be offset from the central position of said engine, arranged along the widthwise direction of said vehicle, to a left side viewed from a front side of said vehicle by the predetermined distance.

9. A layout structure of catalytic converters for an engine transversely arranged in an engine room formed in a front portion of a vehicle, comprising
a front catalytic converter connected to an exhaust manifold arranged in a forward direction of said vehicle with respect to said engine, and a rear catalytic converter connected to an exhaust manifold arranged in a backward direction of said vehicle, wherein said rear catalytic converter is arranged to be offset from a central position of said engine arranged along a widthwise direction of said vehicle by a predetermined distance, and
said respective exhaust manifolds are joined to each other below said engine, and a main catalytic converter is arranged below said engine.

10. A layout structure of catalytic converters for an engine transversely arranged in an engine room formed in a front portion of a vehicle, comprising
a front catalytic converter connected to an exhaust manifold arranged in a forward direction of said vehicle with respect to said engine, a rear catalytic converter connected to an exhaust manifold arranged in a backward direction of said vehicle, and an inter cooler arranged above said engine, wherein said inter cooler is arranged to cause passing air which has cooled said inter cooler to flow to said rear catalytic converter.

11. The layout structure according to claim 10, wherein said inter cooler is arranged to be inclined with respect to an axis extending along a vertical direction of said vehicle and an axis extending along a widthwise direction of said vehicle at predetermined angles, respectively.

12. The layout structure according to claim 10, wherein said rear catalytic converter is arranged to be offset from a central position of said engine arranged along the widthwise direction of said vehicle.

13. The layout structure according to claim 10, wherein said rear catalytic converter is formed into a cylindrical member having an elliptic/oval cross-sectional shape with a major axis coinciding with a longitudinal direction of said vehicle so as to bring the passing air into contact with a substantially flat surface portion of said rear catalytic converter.

14. A layout structure of catalytic converters for a V-type engine transversely arranged in an engine room formed in a front portion of a vehicle, comprising
a front catalytic converter connected to an exhaust manifold arranged in a forward direction of said vehicle with respect to said engine, a rear catalytic converter connected to an exhaust manifold arranged in a backward direction of said vehicle, and an inter cooler arranged above said engine, wherein said inter cooler is arranged to be inclined with respect to an axis extending along a vertical direction of said vehicle and an axis extending along a widthwise direction of said vehicle at predetermined angles, respectively, to cause passing air which has cooled said inter cooler to flow to said rear catalytic converter,
said rear catalytic converter is arranged to be offset from a central position of said engine arranged along the widthwise direction of said vehicle, and
said rear catalytic converter is formed into a cylindrical member having an elliptic/oval cross-sectional shape with a major axis coinciding with a longitudinal direction of said vehicle so as to bring the passing air into contact with a substantially flat surface portion of said rear catalytic converter.

15. The layout structure according to claim 14, wherein said inter cooler is used to cool air introduced into a supercharger arranged between said front and rear engine banks of said engine.

16. The layout structure according to claim 14, wherein said inter cooler is used to cool air introduced into a turbo charger.

17. The layout structure according to claim 14, wherein said V-type engine is a V6 engine having three cylinders in each of front and rear engine banks.

18. The layout structure according to claim 14, wherein passing air which has cooled said substantially flat surface portion of said rear catalytic converter is exhausted to a rear portion of said vehicle through a tunnel portion formed on a bottom surface of said vehicle.

* * * * *